(12) United States Patent
Abichandani et al.

(10) Patent No.: US 7,949,110 B2
(45) Date of Patent: May 24, 2011

(54) DISTRIBUTED ARCHITECTURE FOR IP-BASED TELEMETRY SERVICES

(75) Inventors: Jaideep Abichandani, Carol Stream, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 1190 days.

(21) Appl. No.: 11/609,780

(22) Filed: Dec. 12, 2006

(65) Prior Publication Data

US 2008/0137823 A1    Jun. 12, 2008

(51) Int. Cl.
*H04M 11/00* (2006.01)
(52) U.S. Cl. .............................. 379/106.01; 379/106.03
(58) Field of Classification Search ............. 379/106.01, 379/106.03, 90.01; 340/870.01, 870.02; 370/352
See application file for complete search history.

(56) References Cited

U.S. PATENT DOCUMENTS

| 6,363,057 | B1 * | 3/2002 | Ardalan et al. ................ 370/252 |
| 7,064,679 | B2 * | 6/2006 | Ehrke et al. .............. 340/870.02 |
| 7,480,369 | B2 * | 1/2009 | Magarasevic et al. ..... 379/93.05 |
| 2005/0128956 | A1 | 6/2005 | Hsu et al. | |

OTHER PUBLICATIONS

Granstrom et al. "The Future of Communication Using SIP," *Ericsson Review No. 1* (2002) (8 pages).
Gustafson, "Network Desgign with Mobile IP," Internet Society inet2001 Proceedings, obtained from the internet at http://ftp.isoc.org/inet2001/CD_proceedings/T40/inet_T40.htm on Dec. 4, 2006 (Copyright 2006) (23 pages).
Harley, "Cellular IP Telemetry Services: Dispelling the Myths," *Metretek Whitepaper*, Metretek Incorporated, (Sep. 29, 2003) (7 pages).
Kavak, "Ericsson's Network-Based IP-VPN Solutions," *Ericsson Review No. 3* (2000) (14 pages).
Kasargod et al. "Packet Data in the Ericsson CDMA2000 Radio Access Network," *Ericsson Review No. 3* (2002) (8 pages).
Langer et al., "CDMA2000—A World View," *Ericsson Review No 3* (2001) (9 pages).
Product Data Sheet entitled "DCM-200 Intelligent. Wireless Internet Gateway for AMR & Telemetry Applications," Metretek, Incorportated, obtained from the internet at www.metretekfl.com on Nov. 29, 2006 (No specific date, but not later than applicant's filing date) (1 page).
Product Data Sheet entitled "InvisiConnect," Metretek, Incorporated, obtained from the internet at www.metretekfl.com on Nov. 29, 2006 (Copyright 2003-2004) (1 page).
Product Data Sheet entitled "Pressure Tracker II With Digital Cellular," Metretek, incorporated, obtained from the internet at www.metretekfl.com on Nov. 29, 2006, (Copyright Nov. 2002) (1 page).

* cited by examiner

*Primary Examiner* — Stella L Woo
(74) *Attorney, Agent, or Firm* — Leydig, Voit & Mayer, Ltd.

(57) ABSTRACT

A system and method are described whereby an IP telemetry gateway is hosted by an MVNO in order to relay the telemetry information between remote devices located in an IP network and telemetry servers operated by legacy telemetry customers. In an embodiment, the IP network is a CDMA2000 1X wireless network. Once the IP network identifies a device as part of the telemetry network, it assigns such device a static private IP address. A VPN connection is used to extend the private network of remote devices to the IP telemetry gateway. The IP telemetry gateway maps each remote device's legacy address to its corresponding IP address in order to communicate with the legacy servers and the wireless network via circuit switched and packet data connections respectively. Preferably, the remote devices maintain an always on data connection to allow the telemetry servers to address the remote devices at any time.

20 Claims, 3 Drawing Sheets

DISTRIBUTED ARCHITECTURE FOR IP-BASED TELEMETRY SERVICES

FIELD OF THE INVENTION

This invention relates generally to the field of machine-to-machine communication and more specifically to the field of Internet Protocol based telemetry services.

BACKGROUND OF THE INVENTION

Telemetry services allow remote measurement and reporting of information for subsequent storage or processing. Telemetry applications are used in a wide variety of industries, including public utilities, security, health care, law enforcement, and government sectors. Transmission of telemetry data involves a machine-to-machine communication between a client device and a home server. Typical examples of telemetry applications include remote reading of utility and parking meters, audio/video security surveillance, alarm monitoring, and remote sensor monitoring. Legacy telemetry solutions are based on a circuit switched model, in which a telemetry server periodically communicates with individual client devices by dialing each device's number via an analog communication line.

While telemetry services include wired as well as wireless applications, wireless telemetry is growing in popularity because it allows greater flexibility and lower installation costs. To this end, a growing number of modern telemetry solutions are designed to employ existing wireless telephone networks. As the wireless telephone networks transition from a circuit switched to a packet switched architecture, they employ Internet Protocol (IP) addressing of connected user devices to enhance the wireless networks' compatibility with Internet based services. Similarly, the telemetry field is moving toward IP based services that, among other advantages, support a greater number of remote telemetry devices. Although a conversion to IP based telemetry services is often desirable, many legacy telemetry customers do not wish to host new telemetry server equipment and software due to associated expense and security implications. Similarly, although the wireless network operators often desire to incorporate legacy telemetry customers into their current IP based telemetry services, doing so may require additional expense and resources for managing the legacy connections.

BRIEF SUMMARY OF THE INVENTION

Embodiments of the invention are used to provide an IP telemetry system comprising an IP telemetry gateway managed and hosted by a mobile virtual network operator (MVNO) in order to relay the telemetry information between remote telemetry devices located in an IP network and one or more telemetry servers operated by legacy telemetry customers. The IP telemetry gateway is capable of communicating with the IP network and the legacy telemetry servers based on their respective native modes of communication. The IP telemetry gateway correlates an IP address assigned to each of the devices with another unique device identifier and communicates the telemetry information to one or more legacy telemetry servers via a legacy connection. This architecture allows the legacy telemetry customers to avoid the security and expense issues associated with updating the telemetry server equipment and software, while taking full advantage of expanded capabilities of IP based telemetry. Additionally, this allows the operator of the IP network to shift the additional resources needed for maintaining and managing the IP telemetry gateway and legacy connections to the MVNO.

In one embodiment, the IP network is a wireless network operating in accordance with the CDMA2000 1X specification. In this embodiment, upon granting access to the radio network resources, the network assigns an IP address to each of the remote devices. Preferably, once the IP network identifies a device as part of the telemetry network based on the device's network access identifier (NAI), it assigns a static private IP address to each remote telemetry device in order to conserve the limited pool of public IP addresses available to the wireless network operator. In this embodiment, a secure virtual private network (VPN) connection is used to extend the private network of remote devices to the IP telemetry gateway in order to allow the gateway to address the remote devices via their corresponding private IP addresses.

The IP telemetry gateway, in turn, maps each remote device's legacy address, such as a MIN, ESN or MDN identifier, to its corresponding IP address in order to communicate with the legacy servers and the wireless network via circuit switched and packet data connections respectively. Preferably, the mapping occurs via a lookup table located at the IP telemetry gateway. In an embodiment, the lookup table is populated when the remote devices register with the IP telemetry gateway to provide their MIN or ESN and corresponding IP addresses. When the wireless IP network assigns a static IP address to each of the remote telemetry devices, such address stays with each device, thereby obviating the need to reregister with the IP telemetry gateway. Preferably, the remote devices maintain an always on data connection to allow the telemetry servers to address the remote devices at any time.

In one aspect of the invention, a system is provided for relaying telemetry information, the system comprising a telecommunications network comprising a plurality of remote devices, the remote devices capable of communicating according to a first communication mode, a telemetry gateway in communication with the plurality of remote devices according to the first communication mode, at least one telemetry server monitoring the plurality of remote devices through the telemetry gateway, wherein the at least one telemetry server is capable of communicating with the telemetry gateway according to a second communication mode, and wherein the telemetry gateway includes a first connection to the telecommunications network, a second connection to the at least one telemetry server, and a management connection exclusive of the telecommunications network and the at least one telemetry server.

In another aspect of the invention, a telemetry gateway is provided for relaying telemetry information between a telecommunications network and at least one telemetry server, wherein the telecommunications network is capable of processing the telemetry information according to a first communication mode and the telemetry server is capable of processing the telemetry information according to a second communication mode, and wherein the telemetry gateway includes a first connection to the telecommunications network, a second connection to the at least one telemetry server, and a management connection exclusive of the telecommunications network and the at least one telemetry server.

In still another aspect of the invention, a method is provided for relaying telemetry information between a telecommunications network and at least one telemetry server, the method comprising registering, at a telemetry gateway, a first unique identifier and a second unique identifier, the first and second unique identifiers assigned to a remote device in the telecommunications network, at the telemetry gateway, collecting the telemetry information from the remote device, wherein the remote device is identified to the telecommunications network by the first unique identifier, and communicating the telemetry information to the at least one telemetry server, wherein the remote device is identified to the at least one telemetry server by the second unique identifier, and wherein the telemetry gateway includes a first connection to the telecommunications network, a second connection to the at least one telemetry server, and a management connection exclusive of the telecommunications network and the at least one telemetry server.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
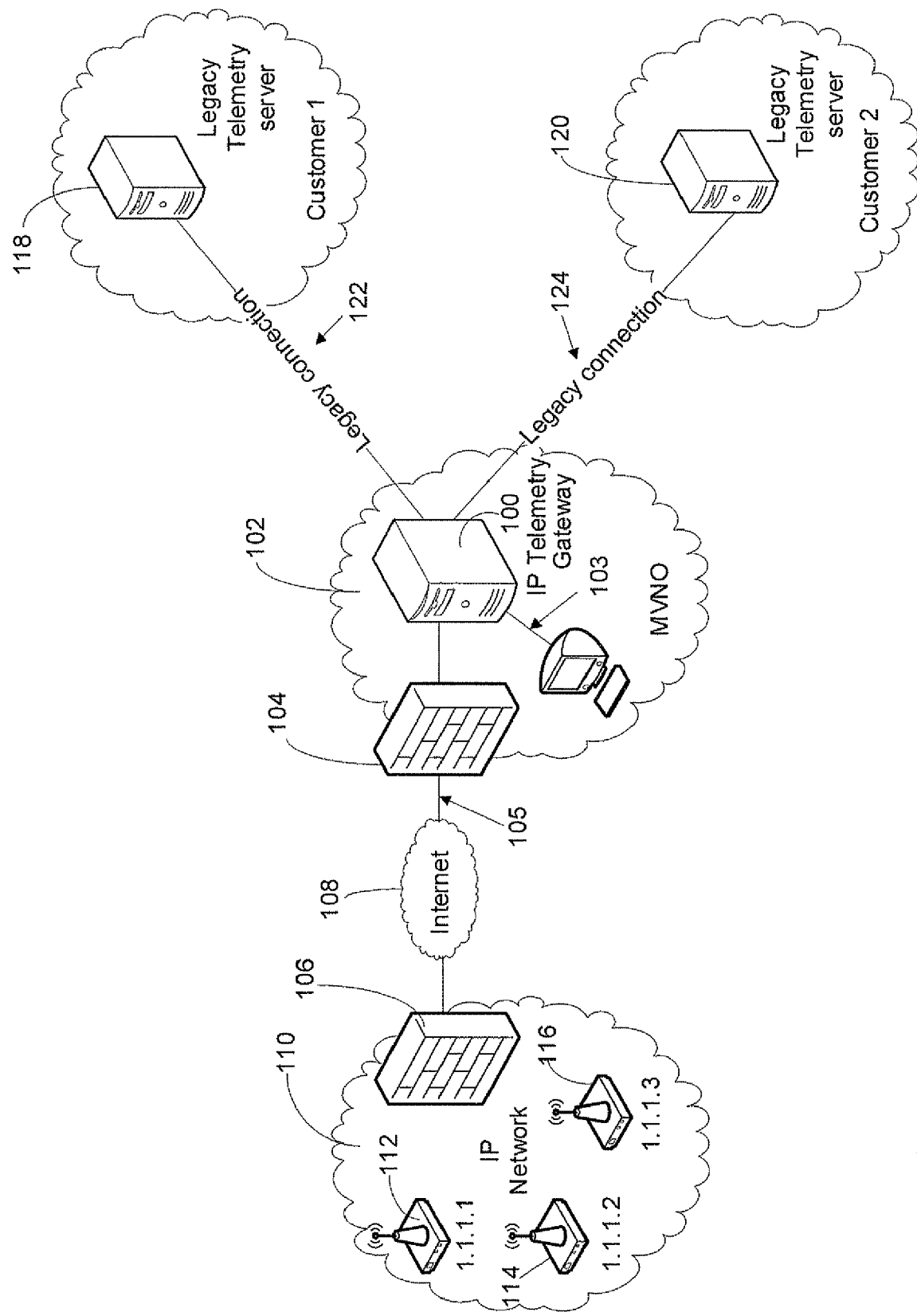
FIG. 1 is a schematic diagram illustrating an IP telemetry system environment, wherein an MVNO network hosts the IP telemetry gateway to relay the telemetry information between an IP network and one or more telemetry servers, as contemplated by an embodiment of the present invention.

Turning to FIG. 1, an implementation of a system contemplated by an embodiment of the invention is shown with reference to the Internet Protocol (IP) telemetry system environment. To distribute the telemetry system resources, an IP telemetry gateway 100 resides in a third party network 102, which is preferably operated by a mobile virtual network operator (MVNO). In this embodiment, an MVNO network 102 manages and hosts the IP telemetry gateway 100 to relay telemetry information between an IP network 110 and one or more telemetry servers 118, 120 based on modes of communication native to the network 110 and telemetry servers 118, 120, respectively. The MVNO network 102 includes a management connection 103, implemented via software or hardware, to the IP telemetry gateway 100 to maintain the operational aspects of the gateway 100 and associated external connections 105, 122, 124.

Preferably, the network 110 is a wireless network operated by a cellular or personal communication service (PCS) provider and capable of communicating with the IP telemetry gateway 100 via packet communication by supporting IP addressing of connected remote devices 112-116. In this embodiment, a secure connection 105 through Internet 108 is employed between the telemetry gateway 100 and the wireless network 110. This is accomplished preferably by interfacing the gateway 100 with the network 110 via VPN routers 104, 106. To relay the telemetry information collected from remote devices 112-116 within the IP based network 110, the IP telemetry gateway 100 correlates an IP address assigned to each of the devices 112-116 with another unique device identifier, such as a mobile identification number (MIN), an electronic serial number (ESN) or a Mobile Device Number (MDN) assigned to each of the devices 112-116, and communicates the telemetry information to one or more legacy telemetry servers 118, 120 via a legacy connection 122, 124. In one embodiment, the legacy connection 122,124 comprises dedicated circuit switched lines. Since the legacy telemetry servers 118, 120 are operated by telemetry customers and, therefore, are located on customer premises, this architecture allows the legacy telemetry customers to avoid the security and expense issues associated with updating the telemetry server equipment and software, while taking full advantage of expanded capabilities of IP based telemetry.

Figure 2:
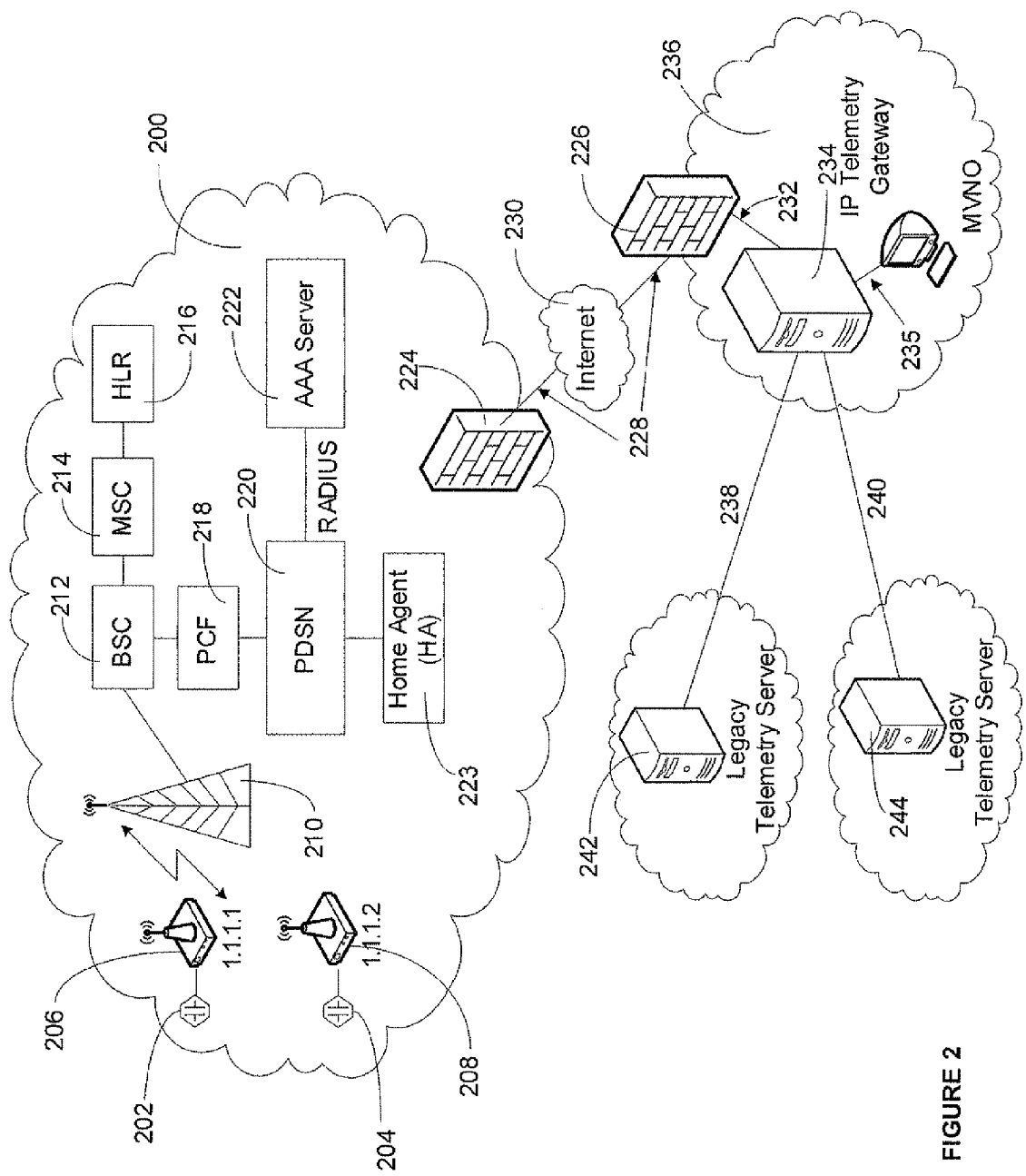
FIG. 2 is a schematic diagram of a system illustrating a particular embodiment of the system of FIG. 1, wherein the IP network is a wireless network operating in accordance with a CDMA2000 1X specification.

FIG. 2 illustrates details relating to an implementation of a particular embodiment of the present invention within a wireless access network 200 operating in accordance with a CDMA2000 1X specification. Other embodiments include using a different radio access network, such as one complying with 1xEV-DO, 1xEV-DV, wideband code division multiple access (WCDMA), or another wireless standard capable of supporting IP based packet communication. In this embodiment, the remote devices 206, 208 interface with the monitoring sensors 202, 204 in order to wirelessly convey the sensor data via the network 200. Examples of remote devices 206, 208 include models INVISICONNECT™ and PRESSURE TRACKER II manufactured by METRETEK INCORPORATED. The type of data reported by the sensors 202, 204 depends on the type of equipment being monitored by a given customer. Examples of telemetry data include alarm sensor data, liquid level sensor data, among others.

The remote devices or mobile nodes 206, 208 initially gain access to the radio access network resources by authenticating their identities at the home location register (BLR) 216. The HLR 216 typically contains a database of subscribers to the home network 200, including MIN or ESN numbers associated with each subscriber's mobile node or remote device. The radio access network resources are typically used to control the radio interface aspect of the network 200 and include the base station 210, as well as the base station controller (BSC) 212, The base station 210 includes radio bearer resources and other transmission equipment necessary for wireless communication of information between the remote devices 206, 208 and other network elements.

The BSC 212, in turn, manages the radio traffic between a plurality of base stations 210, such as by controlling handoff between sectors and/or base stations for those mobile nodes that are capable of mobility. Additionally, the mobile switching center (MSC) 214 is responsible for management of voice calls placed in and out of the network 200. In this embodiment, the BSC 212 is collocated with a packet control function (PCF) 218. When the network 200 comprises multiple packet data serving nodes (PDSN), the PCF 218 routes the data packets to the appropriate PDSN for further processing.

Subsequent to granting access to the radio network, the network 200 assigns an IP address to each of the remote devices 206, 208, as described in the TIA/IS 835-B standard, which is incorporated herein by reference in its entirety. For example, when the remote devices 206, 208 receive an Agent Advertisement Message from the PDSN 220, they generate a Mobile IP (MIP) Registration Request Message that includes each device's network access identifier (NAI), such as "MIN@telemetry.uscc.net."

Upon receipt of the MIP Registration Request Message, the PDSN 220 routes the request to the accounting authentication authorization (AAA) server 222 to ensure that the subscriber associated with the requesting remote device 206, 208 is allowed to use the data network resources. In this embodiment, the PDSN 220 uses the RADIUS protocol to request user authorization at the AAA server 222. The AAA server 222, in turn, authenticates and authorizes the remote device 206, 208 based on the NAI in the MIP Registration Request Message.

Upon completion of the user authorization process, the AAA server 222 forwards the MIP Registration Request Message to the home agent (HA) 223. The HA 223 is typically a router located on the remote device's 206, 208 home network, which tunnels packets to the remote device 206, 208 if the remote device is capable of mobility and is roaming on another network. The HA 223 returns the assigned IP address to the PDSN 220, which, in turn, forwards it to the remote device 206, 208 in a MIP Registration Reply Message.

In an embodiment, a private IP address is assigned to the remote devices 206, 208 in order to conserve the limited pool of public IP addresses available to the operator of the network 200. More preferably, a static private IP address is assigned. The use of private IP addresses allows the network 200 to support large numbers of remote devices 206, 208 as part of the overall IP telemetry system. Specifically, when the remote devices 206, 208 connect to the network 200 based on their specific NAI that identifies them as part of the overall telemetry system, they are assigned a static private IP address from a private IP address pool to ensure that no other remote device or mobile node within the network 200 is assigned the same IP address. Correspondingly, other remote devices within the network 200, whose NAI does not identify them as being part of the telemetry system, are assigned a dynamic public IP address that is subject to reassignment.

Once each of the remote devices 206, 208 obtain a private IP address, they need to communicate the telemetry data to the one or more telemetry servers 242, 244. The telemetry servers 242, 244 are typically located at the telemetry customer's premises and operated by the customer's IT personnel. However, the telemetry servers 242, 244 are legacy servers that communicate via circuit switched lines 238, 240 by dialing into the remote telemetry devices, such as by dialing a device's MIN number. That is, the legacy telemetry servers 242, 244 identify each remote telemetry device based on its MIN, ESN, or MDN number. Hence, legacy telemetry servers 242, 244 do not communicate via a packet mode of communication and are not able to address the remote devices 206, 208 directly via their respective IP addresses.

Therefore, an IP telemetry gateway 234 is provided to bridge the circuit switched servers 242, 244 and IP based remote devices 206, 208. In order to reduce the complexity and cost associated with providing an IP based telemetry service to legacy telemetry customers, the IP telemetry gateway 234 is managed and operated by an entity independent from the operator of the network 200, such as by a mobile virtual network operator (MVNO) 236. The MVNO network 236 includes a management connection 235, implemented via software or hardware, to the IP telemetry gateway 234 to maintain the operational aspects of the gateway 234 and associated external connections 232, 238, 240. In this manner, the additional resources needed for maintaining and managing the IP telemetry gateway 234, including the packet and circuit switched connections 232, 238, 240, are shifted away from the operator of the IP network 200 and to the MVNO 236.

The IP telemetry gateway 234 is capable of communicating with legacy servers 242, 244 via circuit switched lines 238, 240 and with the IP network 200 via a packet data connection 232. Specifically, the IP telemetry gateway 234 maps each remote device's legacy address (e.g., MN or ESN) to its corresponding IP address. Preferably, the mapping occurs via a lookup table located at the IP telemetry gateway 234. The following table provides an example of a lookup table at the IP telemetry gateway 234 containing each remote device's 206, 208 MIN or ESN number and a corresponding private IP address assigned by the network 200.

| Device legacy Address | Device IP Address |
|---|---|
| MIN/ESN 1 | 1.1.1.1 |
| MIN/ESN 2 | 1.1.1.2 |
| MIN/ESN 3 | 1.1.1.3 |

In one embodiment, the lookup table is populated when the remote devices 206, 208 register with the IP telemetry gateway 234. In this case, the remote devices 206, 208 are pre-configured with the IP address or DNS name of the IP telemetry gateway 234. Therefore, after establishing a Mobile IP session and obtaining a private static IP address from the network 200, the remote devices 206, 208 connect to the IP telemetry gateway 234 to provide their MIN or ESN and IP address information. Since the devices 206, 208 are assigned a static IP address, such address stays with each device and the devices 206, 208 do not need to reregister with the telemetry gateway 234. However, when a dynamic IP address is used, the devices 206, 208 will reregister with the telemetry server 234 to provide their newly assigned IP address.

Furthermore, because the remote devices 206, 208 are assigned a private IP address within the network 200, the private network of devices 206, 208 needs to be extended to the external telemetry gateway 234 in order for the gateway 234 to be able to address the remote devices 206, 208 via their corresponding private IP addresses. Therefore, a secure virtual private network (VPN) connection 224, 226 extends the private network of remote devices 206, 208 to the telemetry gateway 234 through the Internet 230. IP protocol messaging 228 is used between the endpoints of the VPN connection 224, 226, such as the IPv4 or IPv6 protocol, which may be secured via the IPsec specification, for example.

Preferably, the data session connection of the remote devices 206, 208 is always on. This allows the telemetry servers 242, 244 to address the remote devices 206, 208 at any time. In one embodiment, the network 200 implements the always on connection via a CDMA2000 dormancy mode in order to release the radio frequency (RF) resources after a predetermined period of inactivity, while maintaining a point-to-point protocol (PPP) connection between the remote devices 206, 208 and the corresponding PDSN 220. In an embodiment, the network 200 releases the RF resources after 20 seconds of inactivity. When the always on connection of the remote devices 206, 208 is not feasible, the IP telemetry gateway 234 sends an SMS Wakeup message to the remote devices 206, 208 in order to re-establish the Mobile IP session.

Figure 3:
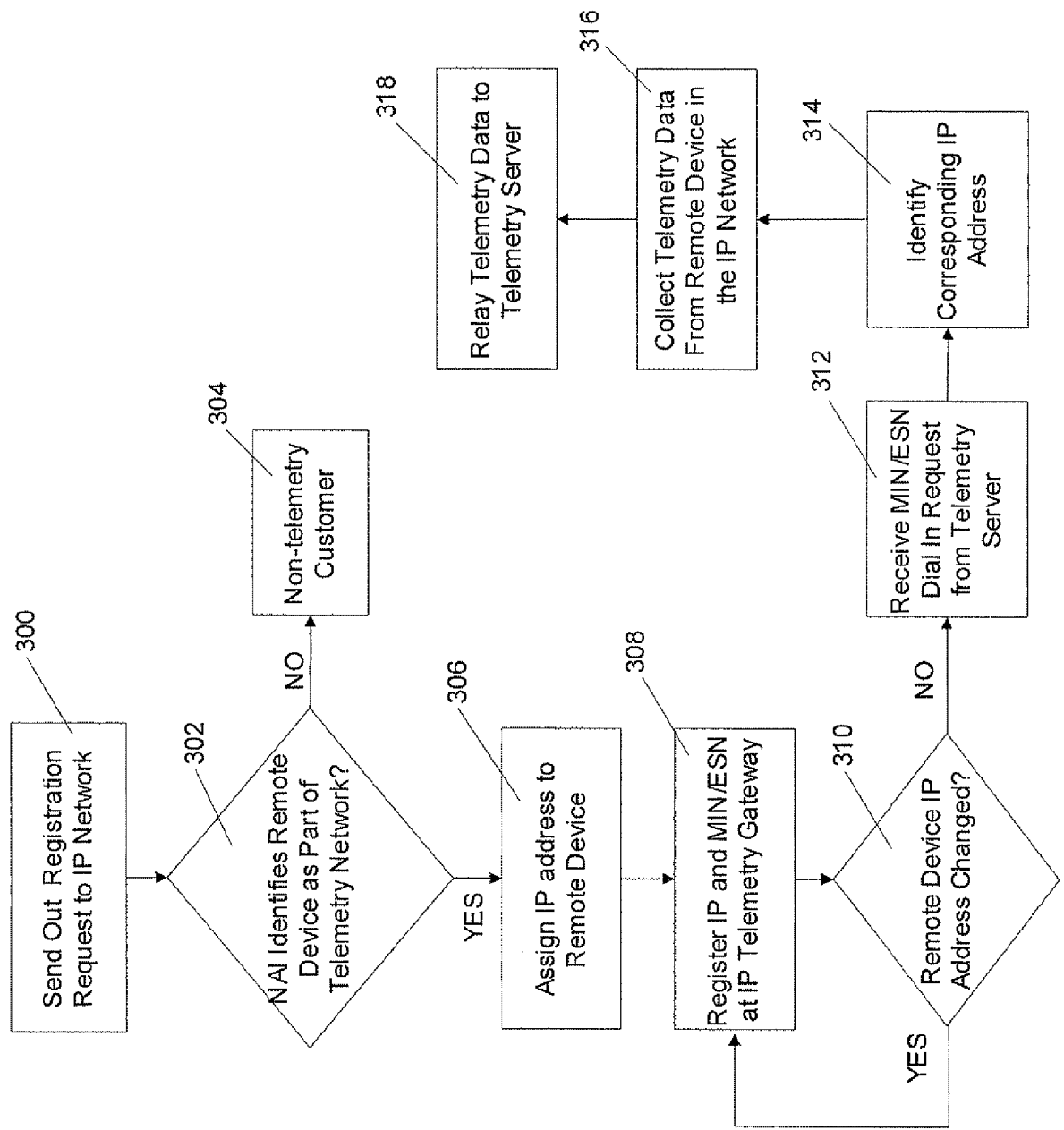
FIG. 3 is a flowchart illustrating a method of relaying telemetry information between one or more legacy telemetry servers and an IP based network, in accordance with an embodiment of the invention.

Turning to FIG. 3, a method for relaying telemetry information between one or more legacy telemetry servers and an IP based network is shown in accordance with an embodiment of the invention. In step 300, the remote devices 206, 208 send out a registration request, such as a MIP Registration Request Message discussed above in connection with FIG. 2, to the network 200 in order to obtain an IP address and gain access to the data network elements. Prior to assigning an IP address, however, the network 200 determines, in step 302, whether the remote devices belongs to the IP telemetry network by examining the NAI transmitted as part of the registration request.

If, based on a given device's NAI, it is not part of the telemetry network, the network 200 processes the registration request in a conventional manner in step 304. If however, the remote device's NAI identifies it as belonging to a telemetry customer, the network 200 assigns it an IP address in step 306. Preferably, the network 200 assigns a private static IP address to each remote device 206, 208. Since the telemetry remote devices 206, 208 are preconfigured with a DNS name or IP address of the IP telemetry gateway 234, the devices 206, 208 next contact the IP telemetry gateway 234 operated by the MVNO 236 to register their IP addresses and corresponding MIN or ESN numbers in step 308.

In step 310, when a given remote device's IP address has changed, such as when the network 200 did not assign a static IP address, such remote device reregisters its new IP address and corresponding MIN or ESN by reinitiating contact with the IP telemetry gateway 234. Otherwise, in step 312, when the IP telemetry servers 242, 244 dial a device's MN or ESN number, the IP telemetry gateway 234 receives this request for telemetry data over its circuit switched connection 238, 240. Next, in step 314, the IP telemetry gateway 234 identifies an IP address corresponding to the device's MIN or ESN number contained in the dial in request. Using the identified IP address, the IP telemetry gateway 234, in step 316, forwards the information request received from the telemetry servers 242, 244 to the IP network 200 in order to collect the requested telemetry data from the corresponding remote device. Finally, in step 318, the IP telemetry gateway 234 relays the collected telemetry data back to one or more telemetry servers 242, 244 via the legacy circuit switched connection 238, 240.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for relaying telemetry information, the system comprising:

an Internet Protocol (IP) based wide area wireless telecommunications network comprising a plurality of remote devices having private IP addresses, the remote devices forming a private telemetry network within the IP based wide area wireless telecommunications network and being capable of communicating according to a first communication mode;

a telemetry gateway in communication with the plurality of remote devices according to the first communication mode;

at least one telemetry server monitoring the plurality of remote devices through the telemetry gateway, wherein the at least one telemetry server is capable of communicating with the telemetry gateway according to a second communication mode; and wherein the telemetry gateway includes a first connection to the IP based wide area wireless telecommunications network, a second connection to the at least one telemetry server, and a management connection exclusive of the IP based wide area wireless telecommunications network and the at least one telemetry server, the first connection comprising a secure connection that extends the private telemetry network of remote devices to the telemetry gateway.

2. The system of claim 1 wherein the first communication mode comprises packet switched communication.

3. The system of claim 1 wherein the second communication mode comprises circuit switched communication.

4. The system of claim 1 wherein each of the private IP addresses is static.

5. The system of claim 1 wherein the secure connection is a VPN connection.

6. The system of claim 1 wherein the telemetry gateway maps an IP address assigned to each of the plurality of remote devices to a unique identifier associated with a circuit switched connection.

7. The system of claim 6 wherein the unique identifier is one of a Mobile Identification Number (MIN), Electronic Serial Number (ESN), and a Mobile Device Number (MDN).

8. The system of claim 1 wherein the plurality of remote devices maintain an always on connection to the telecommunications network.

9. A telemetry gateway for relaying telemetry information between an Internet Protocol (IP) based wide area wireless telecommunications network and at least one telemetry server, wherein the IP based wide area wireless telecommunications network comprises a plurality of remote devices having private IP addresses so as to form a private telemetry network within the IP based wide area wireless telecommunications network which is capable of processing the telemetry information according to a first communication mode, the at least one telemetry server being capable of processing the telemetry information according to a second communication mode; and wherein the telemetry gateway includes a first connection to the IP based wide area wireless telecommunications network, a second connection to the at least one telemetry server, and a management connection exclusive of the IP based wide area wireless telecommunications network and the at least one telemetry server, the first connection comprising a secure connection that extends the private telemetry network of remote devices to the telemetry gateway.

10. The telemetry gateway of claim 9 wherein the first communication mode comprises packet switched communication and the second communication mode comprises circuit switched communication.

11. The telemetry gateway of claim 9 wherein each of the plurality of remote devices is assigned a private static IP address within the telecommunications network.

12. The telemetry gateway of claim 9 wherein the first connection extends the telecommunications network to the telemetry gateway via a VPN connection.

13. The telemetry gateway of claim 9 wherein the gateway maps an IP address assigned to each of the plurality of remote devices to a unique identifier associated with a circuit switched connection.

14. The telemetry gateway of claim 13 wherein the unique identifier is one of a Mobile Identification Number (MIN), Electronic Serial Number (ESN), and a Mobile Device Number (MDN).

15. The telemetry gateway of claim 13 wherein the plurality of remote devices maintain an always on connection to the telecommunications network.

16. A method for relaying telemetry information between an Internet Protocol (IP) based wide area wireless telecommunications network and at least one telemetry server, the method comprising:

registering, at a telemetry gateway, a first unique identifier and a second unique identifier, the first and second unique identifiers assigned to a remote device in the IP based wide area wireless telecommunications network, the first unique identifier comprising a private IP address of the remote device so as to form part of a private telemetry network of remote devices within the IP based wide area wireless telecommunications network;

at the telemetry gateway, collecting the telemetry information from the remote device, wherein the remote device is identified to the telecommunications network by the first unique identifier, and communicating the telemetry information to the at least one telemetry server, wherein the remote device is identified to the at least one telemetry server by the second unique identifier; and wherein the telemetry gateway includes a first connection to the IP based wide area wireless telecommunications network, a second connection to the at least one telemetry server, and a management connection exclusive of the IP based wide area wireless telecommunications network and the at least one telemetry server, the first connection comprising a secure connection that extends the private telemetry network of remote devices to the telemetry gateway.

17. The method of claim 16 wherein the private IP address is a private static IP address.

18. The method of claim 16 wherein the second unique identifier comprises one of a Mobile Identification Number (MIN), Electronic Serial Number (ESN), and a Mobile Device Number (MDN).

19. The method of claim 16 wherein the first connection is a VPN connection.

20. The method of claim 16 further comprising maintaining an always on connection between the remote device and the telecommunications network.

* * * * *